(No Model.) 3 Sheets—Sheet 1.
L. K. BINGHAM.
APPARATUS FOR MAKING PRINTERS' ROLLERS.

No. 419,912. Patented Jan. 21, 1890.

Witnesses,
Thos. Houghton.
F. Fadely.

Inventor,
L. K. Bingham,
per W. H. Singleton
Attorney (No Model.) 3 Sheets—Sheet 2.
L. K. BINGHAM.
APPARATUS FOR MAKING PRINTERS' ROLLERS.

No. 419,912. Patented Jan. 21, 1890.

Witnesses
Thos Houghton.
F Fadely

Inventor
L. K. Bingham.
by W. R. Singleton
Attorney (No Model.) 3 Sheets—Sheet 3.

L. K. BINGHAM.
APPARATUS FOR MAKING PRINTERS' ROLLERS.

No. 419,912. Patented Jan. 21, 1890.

Witnesses
Thos. Houghton.
F. Sadley.

Inventor
L. K. Bingham.
per M. Singleton.
Attorney

N. PETERS, Photo-Lithographer, Washington, D. C.

UNITED STATES PATENT OFFICE.

LEANDER K. BINGHAM, OF NEW YORK, N. Y.

APPARATUS FOR MAKING PRINTERS' ROLLERS.

SPECIFICATION forming part of Letters Patent No. 419,912, dated January 21, 1890.

Application filed February 15, 1889. Serial No. 299,949. (No model.)

*To all whom it may concern:*

Be it known that I, LEANDER K. BINGHAM, a citizen of the United States, residing at New York, in the county of New York and State of New York, have invented certain new and useful Improvements in Apparatus for Making Printers' Rollers; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
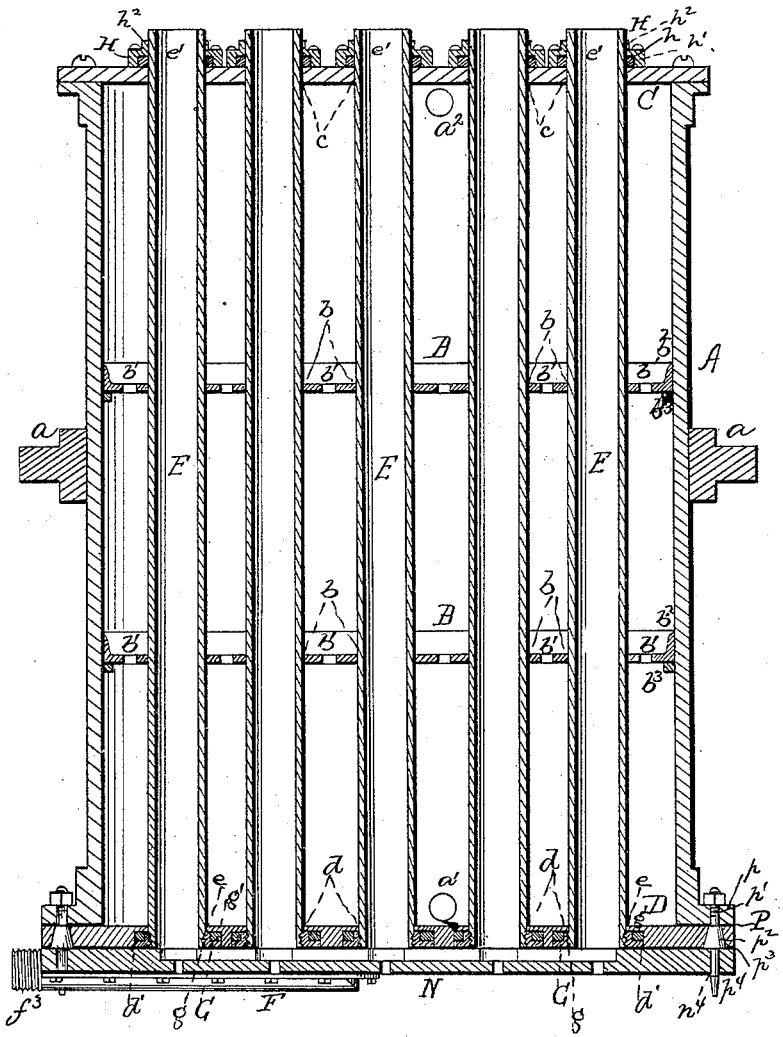
Figure 3:
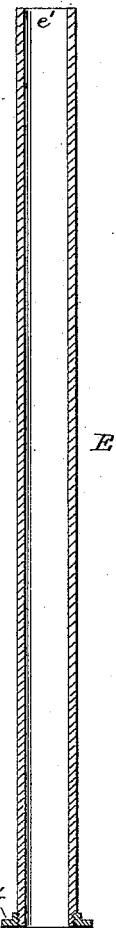
Figure 2:
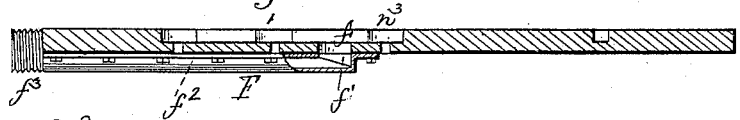
Figure 4:
Figure 5:
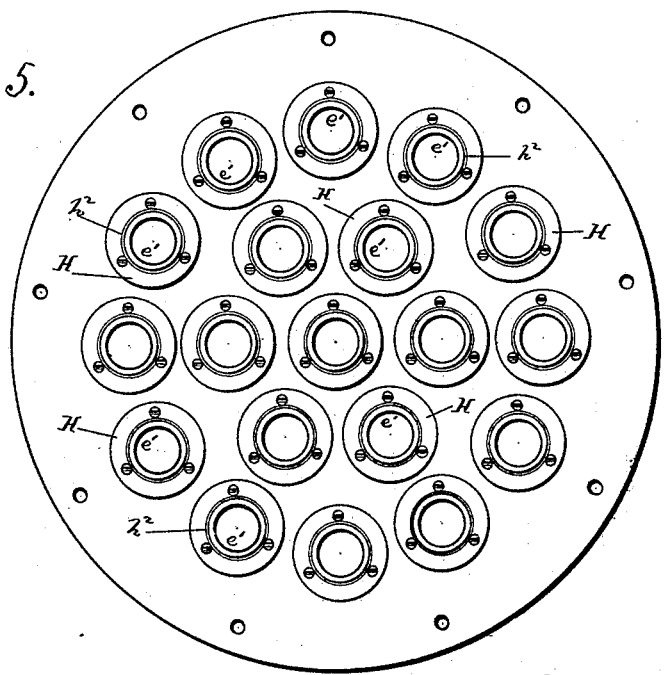
Figure 6:
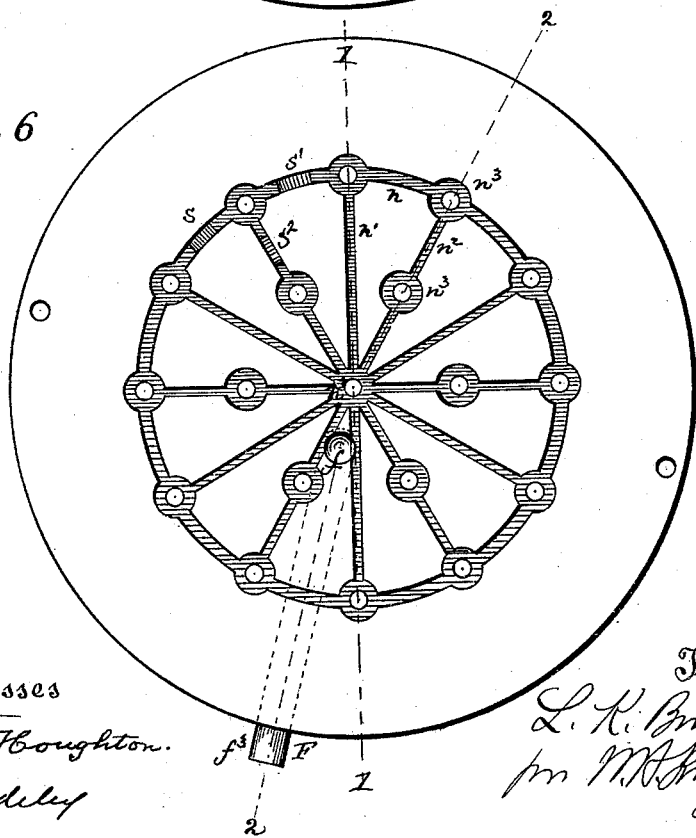
Figure 7:
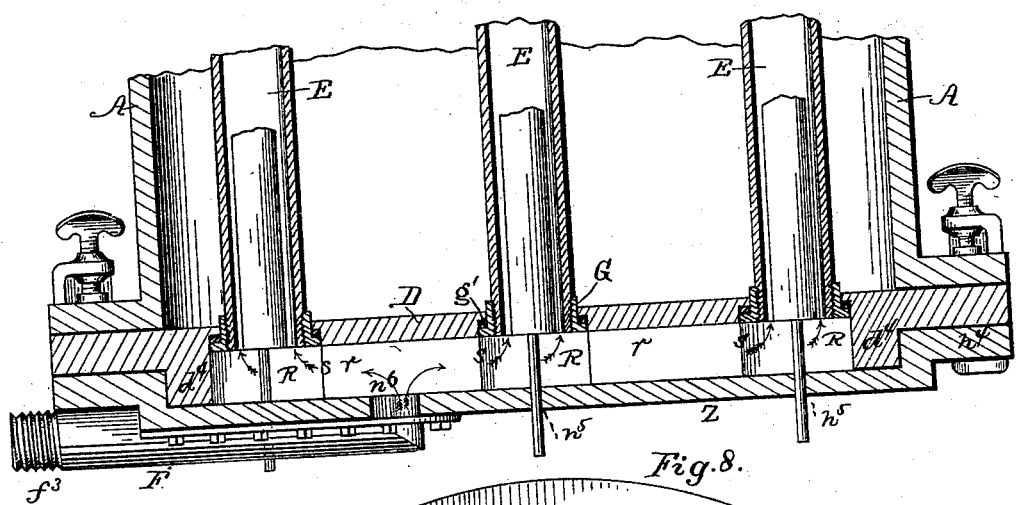
Figure 8:
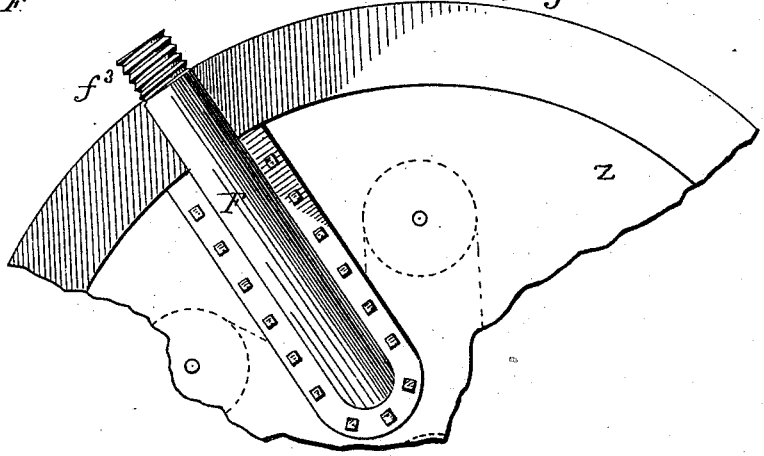

Figure 1 is a vertical diametric section through the apparatus, the supplemental bottom being cut on the line 1 1, Fig. 6. Fig. 2 is a section of the supplemental bottom on the line 2 2, Fig. 6. Fig. 3 is a vertical section of one of the mold-tubes detached. Fig. 4 is a perspective view of one-half of one of the glands at the bottom of the mold-tubes. Fig. 5 is a top view of the top head of the cylinder with the mold-tubes in place. Fig. 6 is a top view of the supplemental bottom. Fig. 7 is an enlarged detail of part of the bottom of the apparatus, showing a modification of said bottom. Fig. 8 is an underneath view of Fig. 7.

This invention relates to certain improvements in apparatus for making printers' rollers, whereby the apparatus is made stronger, less liable to be affected by alternations of heating and cooling, the composition can be admitted at the bottom under pressure, and the supplemental bottom is centered with accuracy, all of which will be explained hereinafter.

In the annexed drawings, the letter A indicates a cylinder or receptacle having the trunnions $a\ a$, whereby it is to be supported in suitable bearings. This cylinder or receptacle also has the steam and water inlet $a'$ and the overflow $a^2$. Within the cylinder are placed several diaphragms or cross-heads B, provided with the large holes $b$, and among these the small apertures $b'$, forming thus foraminous diaphragms. The holes $b$ are the same in number and are aligned with the holes $c$ and $d$ in the cylinder-heads C and D. These diaphragms may have the upturned edges $b^2$, by which they may be secured in place, or they may rest on the ledges $b^3$.

Passing through the holes $c\ b\ d$ are the mold-tubes E, fitting said holes snugly and steam-tight. The holes $d$ of the head D have on the outside the cylindrical countersinks $d'$. Fitting these countersinks $d'$ are the glands G, which are internally threaded at $g$ to fit threads $e$ upon the lower ends of the tubes E, a packing $g'$ being interposed between the glands and the bottoms of the countersinks. By means of these glands and packings the tubes are held to the head D by a steam-tight joint, the outer surface of the glands being flush with the face of the head D, the whole making a close, compact, and smooth finish to the connection between the mold-tubes and the bottom head.

Surrounding the top projecting ends $e'$ of the mold-tubes E are the rings H, having a recess $h$, wherein are the packing $h'$ and the necks $h^2$, which closely fit the ends $e'$ of the mold-tubes H. This forms a close-fitting joint at the top of these mold-tubes and yet allows proper movement thereof, as will be explained.

Secured to the bottom head D is the supplemental bottom N. This bottom has in its upper face the channels $n\ n'\ n^2$, arranged as shown, and the recesses $n^3$, the channels connecting the recesses, as indicated. These recesses are so located that when the supplemental bottom is in place a recess will come under each lower end $e$ of a mold-tube E, as fully shown in Fig. 1. Made in this supplemental bottom is a hole $f$ off to one side from the center recess. Secured to the underside of the supplemental bottom is the inlet F, having the opening $f'$ at the hole $f$, the flange $f^2$ for securing it to the supplemental bottom, and the projecting threaded tubular extension $f^3$.

The head D is held to the flange $p$ at the bottom of the shell of the cylinder by the pins P. These pins have the cylindrical parts $p'$, which pass through the flange $p$, the conical parts $p^2$, which engage similar conical holes $p^3$ in the head D, and the projecting parts $p^4$. The conical parts of the pins secure the bottom head D to the cylinder-shell. The supplemental bottom N has holes $n^4$ to engage the pins P. Two such holes are sufficient to engage two of the pins, which are at the ends of a diameter. Thus the supplemental bottom is assuredly centered and its recesses are aligned with the bottoms of the mold-tubes. This supplemental bottom is held to the head D by screws or clamps, as may be desired, the latter method being exemplified in the modification shown in Fig. 7. In this form the channels $r$ are made in the bottom of the head D, the countersinks R are made deeper than in the other form, and the glands and packings are seated at the bottoms of these countersinks, having openings $s$ from the channels into said countersinks. When these channels are made in the head D, the latter will be somewhat thicker than when the channels are in the supplemental bottom, the center of the head being dropped, as shown at $d^4$. In this case the supplemental bottom is made cup-shaped, so as to fit snugly the head D, the upper surface or the supplemental bottom being flat, as shown, and the bottom being provided with the circumferential flange $n^4$, by which it is clamped in place. The supplemental bottom has the holes $n^5$ for the ends of the roller-stocks, and the aperture $n^6$, to which the inner end of the composition-inlet is secured.

An apparatus constructed as described is strong and rigid. The diaphragms not only support the shell, but they sustain the mold-tubes, preventing the latter from "buckling." When steam, and then water, is admitted into the bottom of the cylinder it rises gradually, passing through the openings in the diaphragms and heating or cooling, as the case may be, the entire apparatus. The mold-tubes have steam and water tight joints at top and bottom, and yet due expansion and contraction of the mold-tubes is allowed, as they have plenty of play with these top rings.

By the construction at the bottom the composition can be let into the cylinder or receptacle at the bottom under any desired pressure, and rises in the mold-tubes free from any air-bubbles or foaming and in a condition to set firm and solid.

If it be desired not to use all the mold-tubes, one or more may be closed by using stop-gates such as indicated at $s'$ $s^2$ in Fig. 6, or a plug may be placed in the bottom of any one or more mold-tubes.

With the construction described the mold-tubes are removable from the cylinder, which is of great advantage in case changes are necessary. Sometimes the interior of the mold-tubes becomes roughened, scratched, or otherwise changed from a polished surface. They have to be removed so as to be refitted. By having the tubes movable they can be readily taken out and put in with slight trouble.

I am aware that a boiler has been devised the tubes of which are fast at one end and loose at the other. By making the mold-tubes tight at one end and loose at the other and combining therewith the diaphragms there is insured due expansion and contraction. Without the diaphragms the mold-tubes, when affected by change of temperature, tend to buckle, and thus bind at the loose ends. The diaphragms preventing this buckling insures the due longitudinal movement of the mold-tubes.

In this case I have shown and described in detail the construction and function of channels at the bottom of the apparatus, so that the full operation of the device may be understood; but I lay no claim to such construction herein, it being the subject of another application filed July 19, 1889, Serial No. 318,024.

Having described my invention, what I claim is—

1. In an apparatus for making printers' rollers, the combination of the top and bottom heads having the openings for the mold-tubes and several foraminous diaphragms placed within the apparatus and having the holes for the mold-tubes, with such mold-tubes fast at one end and loose at the other, as set forth.

2. In an apparatus for making printers' rollers, the mold-tubes and the heads of the apparatus, in combination with the rings surrounding the ends of the mold-tubes at the said heads, the mold-tubes being held fast in one set of rings and loose within the other set, as set forth.

3. In an apparatus for making printers' rollers, the combination of the cylinder having the two heads, the mold-tubes held in these heads, with the glands fitting around the ends of the mold-tubes at the lower head of the apparatus, such glands being fastened to this head and sustaining the mold-tubes in place therein, as set forth.

4. The combination of the cylinder the bottom head of which has the conical holes, the supplemental bottom, and the guide pins P, having the conical parts, which fit the conical holes in the bottom head of the cylinder, as set forth.

In testimony whereof I affix my signature in presence of two witnesses.

LEANDER K. BINGHAM.

Witnesses:
 THOS. HOUGHTON,
 M. DORIAN.